United States Patent

Czinki

[11] Patent Number: 6,044,768
[45] Date of Patent: Apr. 4, 2000

[54] APPARATUS TO AID MOVEMENT IN A GRAVITY FREE ENVIRONMENT

[76] Inventor: Tibor Czinki, 10105 Forestgrove La., Mitchellville, Md. 20721

[21] Appl. No.: 08/951,103

[22] Filed: Oct. 15, 1997

[51] Int. Cl.[7] .................................................. A63G 21/00
[52] U.S. Cl. ........................ 104/134; 104/53; 104/139; 104/140; 472/131; 482/66; 482/70
[58] Field of Search ................................ 104/62, 53, 134, 104/135, 139, 140, 145; 472/90, 131; 482/66, 70

[56] References Cited

U.S. PATENT DOCUMENTS

| | | | |
|---|---|---|---|
| 3,749,400 | 7/1973 | Stoffel | 482/123 |
| 5,503,609 | 4/1996 | Bull | 482/70 |
| 5,522,321 | 6/1996 | Mosley et al. | 104/60 |

*Primary Examiner*—S. Joseph Morano
*Assistant Examiner*—Robert J. McCarry, Jr.

[57] ABSTRACT

A support for aiding a person, robot or material-moving member in a gravity free environment. The support comprises a platform having slots therein with releasable securing means disposed on either side thereof which cooperate with a wheeled member disposed in the slot having a shoe connected thereto with cooperating means engaging the releasable securing means to permit the person, robot or the like wearing the shoes to traverse the support in a safe, regulated manner.

6 Claims, 3 Drawing Sheets

APPARATUS TO AID MOVEMENT IN A GRAVITY FREE ENVIRONMENT

BACKGROUND OF THE INVENTION

Controlled movement of astronauts in space is well known and exemplified by U.S. Pat. Nos. 3,612,465, 4,917,215 and 5,042,173 each of which disclose structure for maintaining and stabilizing an astronaut while performing various tasks.

U.S. Pat. No. 3,612,465 discloses a pair of rails extending from the exterior of the space ship or space station on which the astronaut moves and is restrained by specially designed foot support means in combination with brake means to permit him to stop when desired.

U.S. Pat. No. 4,917,215 discloses a platform having a plurality of like spaced members disposed over the surface thereof which captively holds an astronauts foot-engaging support permitting him to move freely there over and stop when necessary.

U.S. Pat. No. 5,042,'73 also discloses an anchored rail with foot-engaging means permitting the astronaut to move or stop as desired.

The present invention, like the aforementioned patents, falls into the broad area of assists for aiding the movement of astronauts in space.

SUMMARY OF THE INVENTION

The present invention is directed to the same general idea of assisting the movement of an astronaut in space as that disclosed in the aforementioned patents, and is a composite of the same. The present invention utilizes a support extending outwardly of a space ship of station and has spaced slots for constraining the movement of shoe means worn by the astronaut therein. The shoes are provided with releasable securing means for cooperating with means disposed along the slots permitting the astronaut to stand in one place when desired.

DESCRIPTION OF THE INVENTION

Figure 1:
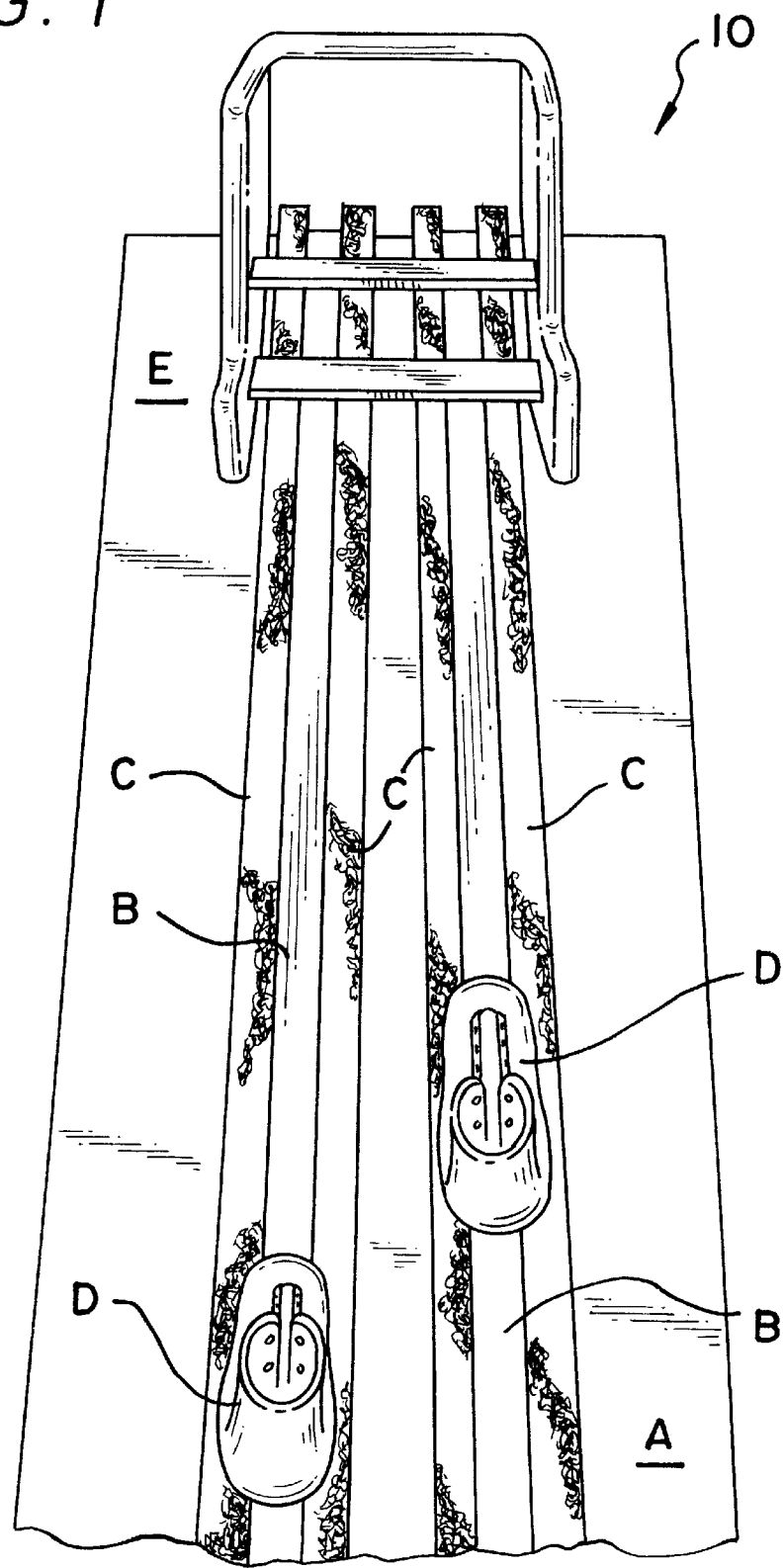
FIG. 1 is a perspective view of the platform and foot-engaging, traversing means of the present invention.

With reference to FIG. 1, the present invention is, in its broadest aspect, depicted generally as 10 and is seen to comprise a support A, a pair of generally spaced parallel slots B disposed therein, strips of Velcro, or the like, C, C disposed on either side of the slots B, B, a pair of shoes, boots or other foot-engaging means D with one of each disposed in respective slots B and an accessory E which is seen to be a conventional table but which can be of any type of support positioned forwardly of the foot-engaging means for moving material.

Figure 2:
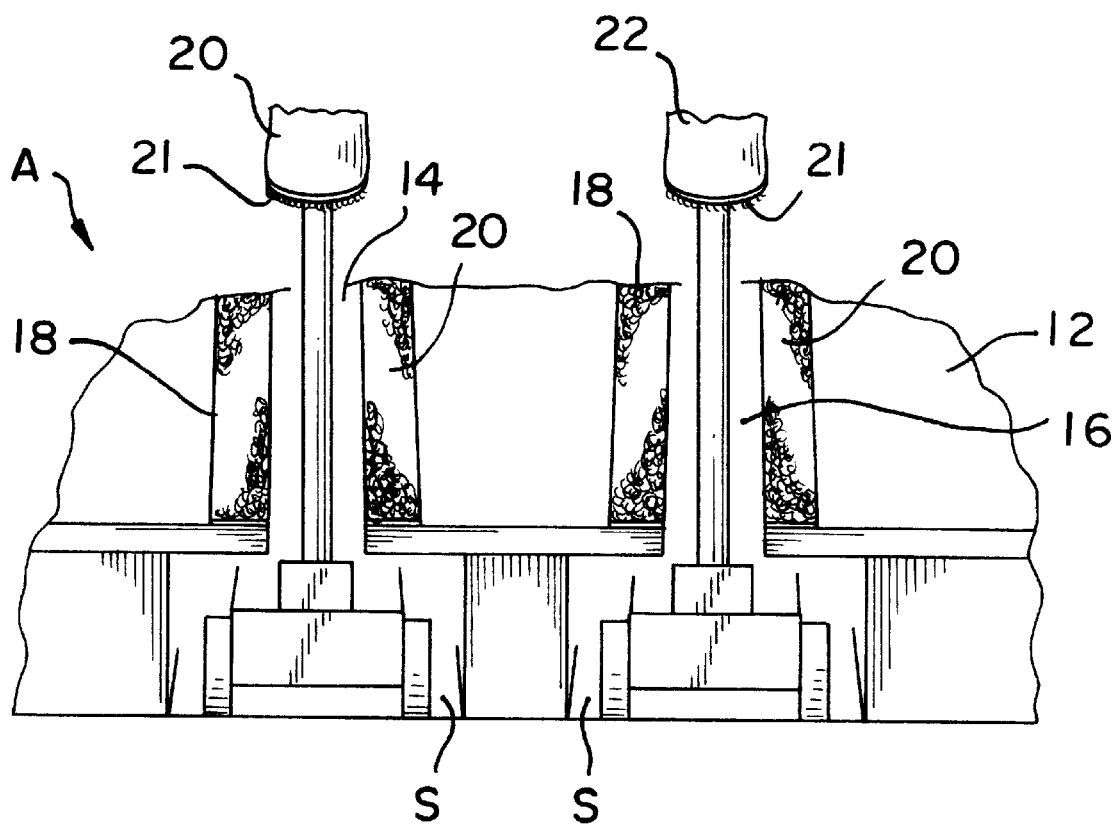
FIG. 2 is a detailed view of the slotted platform and the relationship of the shoe traversing means with respect thereto.

The details of the support A as seen in FIG. 2 are seen to include a platform 12 which can be fabricated from any suitable self-sustaining material having a pair of spaced slots or passageways 14, 16 having foot-engaging means 20, 22, shown in outline, constrained for movement therein to permit a person, robot of the like to traverse the same. While a pair of generally straight slotted tracks 14, 16 are shown, alternative patterns such as shown in U.S. Pat. Nos. 3,612,465 and 5,042,173 are considered to be within the purview of the present invention.

Strips of Velcro or other releasable securing means* 18, 20 are disposed on either side of the slots 14, 16 which will cooperate with complimentary material positioned, preferably, on the underside of the foot engaging means D for reasons to be explained hereinafter.

*Such as adhesive, mechanical interengagable memers, etc, all known in the prior art.

Figure 3:
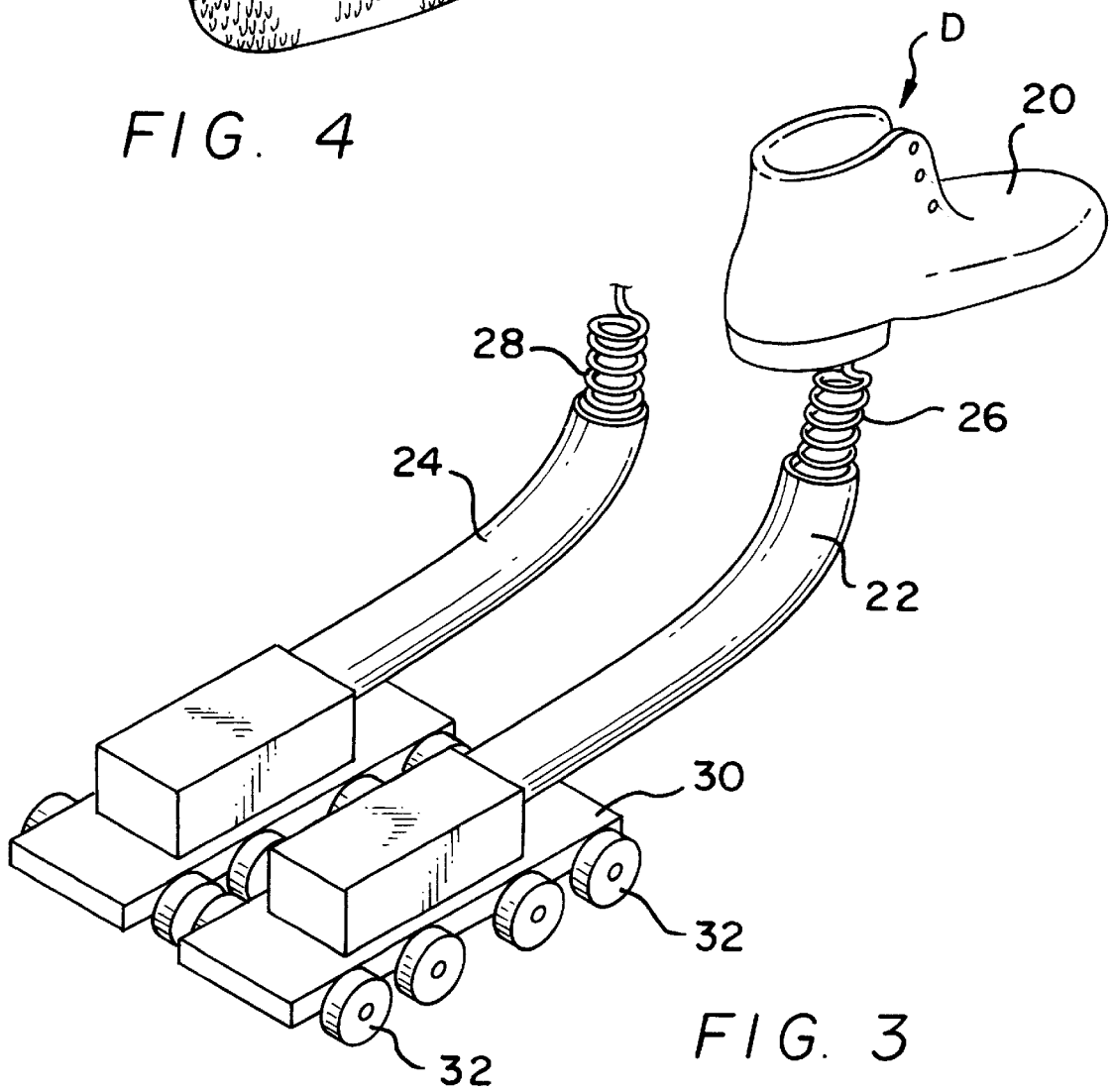
FIG. 3 is a view of the shoe and its mounting on its wheeled support.

The details of one of the boots D and its supporting structure is seen in FIG. 3 and is seen to include a boot or other foot-engaging means 20 secured to a pair of stacked tubular members 22, 24 through the medium of a pair of springs 26, 28 anchored therein to permit the shoe 20 to move outwardly thereof. The other ends of the tubes 22, 24 are secured to a platform 30 having pairs of spaced wheels 32 on either side of the same for permitting the same to roll, as will be explained hereinafter. The details of the manner in which the tubes are anchored or secured to the platform are not important with the major consideration being that it will not disengage from the same.

Figure 4:
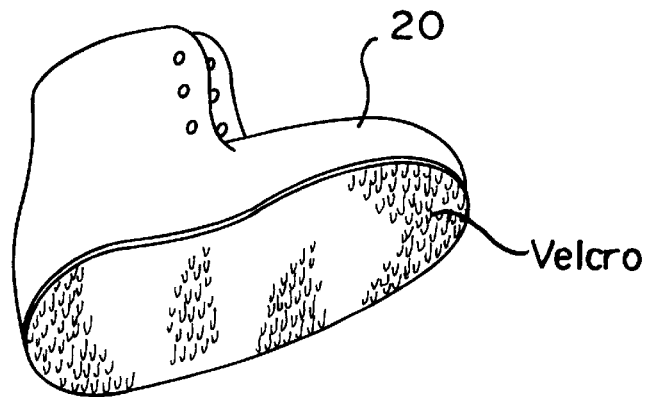
FIG. 4 is a view of the bottom of the shoe showing Velcro thereon.

As seen in FIG. 4, the boot or shoe 20 is provided with Velcro 21 which can be provided in strip form and can cover portions of or the entire shoe with its function being to cooperate with the Velcro strips 18, 20 on the platform 12.

In use, the astronaut, robot or the like places his feet in the respective shoes D, D on the platform 12 with their respective wheeled support platforms 30, 30 being disposed and constrained in the spaces S, S formed beneath the slots 14, 16 as seen in FIG. 2. In the initial start position, the Velcro 21 on the underside of the shoes 20, 22 will be in engagement with the Velcro strips 18, 20 and the astronaut will begin to traverse the support by pulling one of the shoes 20, 22 upwardly against the tension of the springs 26, 28 thereby releasing the engagement of the Velcro and permitting him to pull the movable platform 30 forwardly in the space. After moving one foot and reengaging the Velcro to anchor the same, he proceeds to move the other foot in the same fashion until he reaches his destination.

The present invention permits the astronaut to move and stop as desired.

I claim:

1. An apparatus permitting an individual to traverse a surface including at least one pair of elongated tracks, at least one foot support member worn on a foot of said individual and cooperating with said pair of tracks and being constrained for movement therealong, first releasable securing means disposed adjacent and along the extent of at least one of said pair of elongated tracks, and cooperating releasable means secured to said foot support member adapted to engage and disengage said first releasable securing means adjacent said track allowing said individual to traverse said surface by alternately engaging and disengaging the same by movement of the foot support member thereover.

2. The apparatus of claim 1 wherein a second releasable securing means is disposed adjacent and along the extent of the other of said pair of tracks said cooperating releasable means secured to said foot support member engaging and disengaging said second releasing means on said other track as said individual traverses the same.

3. The apparatus of claim 2 wherein another pair of elongated tracks is disposed adjacent said at least one pair of tracks and has first and second releasable securing means disposed adjacent and along the extent of said another pair of tracks to be engaged by cooperating releasable means secured to a second foot support member worn on the other foot of said individual and constrained for movement therealong.

4. The apparatus of claim 3 wherein said one pair and said another pair of elongated rails are each disposed over openings, wheeled platforms disposed in each of said openings and constrained for movement therein, members connected to each if said platforms and extending upwardly between said one pair and said another pair of elongated rails, and said at least one and said second foot support members being respectively connected thereto.

5. The apparatus of claim 4 wherein spring means have one end connected to said upwardly extending member and its free end to the foot support member.

6. The apparatus of claim 5 wherein the upwardly extending member is tubular and the spring means is secured therein.

* * * * *